United States Patent
Lee

(10) Patent No.: US 6,729,042 B2
(45) Date of Patent: May 4, 2004

(54) ENHANCEMENT OF FLUID REPLACEMENT IN POROUS MEDIA THROUGH PRESSURE MODULATION

(75) Inventor: Kang P. Lee, Sudbury, MA (US)

(73) Assignee: Aspen Systems, Inc., Marlborough, MA (US)

( * ) Notice: Subject to any disclaimer, the term of this patent is extended or adjusted under 35 U.S.C. 154(b) by 17 days.

(21) Appl. No.: 10/124,433

(22) Filed: Apr. 16, 2002

(65) Prior Publication Data

US 2002/0153327 A1 Oct. 24, 2002

Related U.S. Application Data

(60) Provisional application No. 60/285,751, filed on Apr. 23, 2001.

(51) Int. Cl.[7] .................................................. F26B 3/00
(52) U.S. Cl. ............................. 34/444; 34/492; 34/337; 34/339; 516/104
(58) Field of Search ......................... 34/337, 339, 340, 34/348, 350, 351, 402, 422, 444, 492, 61, 191, 405, 413; 516/99, 102, 104, 111; 423/338; 501/12

(56) References Cited

U.S. PATENT DOCUMENTS

| | | | |
|---|---|---|---|
| 5,133,859 A | | 7/1992 | Frank et al. .............. 210/198.2 |
| 5,428,291 A | * | 6/1995 | Thomann et al. ........... 324/303 |
| 5,514,220 A | | 5/1996 | Wetmore et al. .............. 134/22 |
| 5,565,775 A | * | 10/1996 | Stallmach et al. .......... 324/303 |
| 6,005,389 A | * | 12/1999 | Prammer .................... 324/303 |
| 6,149,814 A | | 11/2000 | Allington et al. ........... 210/634 |
| 6,294,194 B1 | | 9/2001 | Horhota et al. ............. 424/456 |
| 6,393,719 B1 | * | 5/2002 | Stipp ............................ 34/115 |
| 6,470,597 B1 | * | 10/2002 | Stipp ............................ 34/422 |

OTHER PUBLICATIONS

English language translation of May 6, 2003 office action from the ROC (Taiwanese) Intellectual Property Office in connection with counterpart Taiwanese Paten Application No. 091108118.

U.S. patent application Ser. No. 09/693,390, filed Oct. 20, 2000, Entitled: "Rapid Aerogel Production Process," by Kang P. Lee, et al. pp. 1–40 together with one (1) page of the Disclosure.

Copy of Jul. 15, 2002 Internatioal Search Report for corresponding International Application No. PCT/US02/12110.

* cited by examiner

*Primary Examiner*—Henry Bennett
*Assistant Examiner*—Camtu Nguyen
(74) *Attorney, Agent, or Firm*—George W. Neuner; Richard J. Roos; Edwards & Angell, LLP

(57) ABSTRACT

A method is described for enhancing mass and heat transport of fluids in a fine pore structure through an appropriate modulation of the fluid pressure. For example, in an air drying process for a porous material that contains liquid, the air pressure is modulated throughout the volume of the drying chamber. Alternatively, the fluid pressure is modulated in a process stream. As an example, this method can be used for rapid drying of any open porous substances ranging from small pored materials such as aerogels and xerogels, to larger pored substances or articles such as industrial articles, agricultural articles (e.g., densely stacked vegetables, coffee beans, hops and other grains), paper-based products, thin films, pharmaceuticals, cloth, and clothing.

54 Claims, No Drawings

ENHANCEMENT OF FLUID REPLACEMENT IN POROUS MEDIA THROUGH PRESSURE MODULATION

CROSS REFERENCE TO RELATED APPLICATION(S)

This application claims priority from, and incorporates by reference the entirety of U.S. Provisional Patent Application Ser. No. 60/285,751, which was filed on Apr. 23, 2001.

FIELD OF THE INVENTION

The present invention relates to methods for enhancing replacement of one fluid in a porous medium by a second fluid. Particularly, the present invention relates to the use of pressure fluctuation to enhance the mass and heat transport in a porous medium and, in particular, the replacement of one fluid in a porous medium by a second fluid. More particularly, the present invention relates to such methods wherein at least one of the fluids is compressible. Various applications include drying, solvent exchange, removal of soluble impurities, and the like.

BACKGROUND OF THE INVENTION

Many processes involve the replacement of one fluid in a porous media by a second fluid. For example, the process of drying involves the replacement of a liquid, frequently water, with a gas, usually air, through a process of evaporation. In another example, the extraction of caffeine from coffee beans can be considered as imbibing a solvent for the caffeine into the bean and replacing the solvent containing the caffeine with pure solvent, thereby extracting the caffeine from the bean. Also, aerogel products, after wet gel formation, are conventionally prepared by a process of solvent exchange between liquid $CO_2$ and the solvent that was utilized to form the wet gels, followed by a supercritical $CO_2$ extraction.

It often is desirable to perform these processes in a shorter period of time. Frequently, heat is used to hasten or sustain or support such processes. However, the heat transfer inside the porous medium can be very slow, and there are times when the application of high temperature heat can degrade the product. In drying, often vacuum is applied to hasten the process without degrading by heat. However, vacuum application requires extra equipment and expense, and still may require considerable time periods for completion of the process. Further, repressurization or depressurization may require care to avoid harm to the product.

Supercritical fluids can be used as solvents in extraction instruments, chromatographs and other related instruments. In supercritical fluid extraction, an extraction vessel is held at a temperature above the critical point and is supplied with fluid at a pressure above the critical pressure. Under these conditions, the fluid within the extraction vessel is a supercritical fluid. In supercritical fluid chromatography, a similar process is followed except that the supercritical fluid moves the sample through a column, separates some of the components of the sample one from the other, and removes the components from the column.

The critical temperature is the temperature above which the distinction between gases and liquids disappears—that is, where there is one fluid phase for all pressures, and where, no matter how much pressure is applied, a liquid phase cannot be condensed. The supercritical region is defined by all temperatures and pressures above the critical temperature and pressure. Supercritical fluids are a useful hybrid of gases and liquids as we commonly perceive them, possessing gas-like viscosities, liquid-like densities, and diffusivities greater than typical liquid solvents. The liquid-like density of a supercritical fluid imparts a variable liquid-like solvent power by an essentially linear function of density. This allows the solvent power, usually considered a chemical interaction, to be set ("dialed in") simply by adjusting a physical parameter, namely density or pressure.

The supercritical fluid transport properties of relatively low viscosity and relatively low diffusivity allow enhanced mass transport within complex matrices, such as coal, plant or animal tissue, or packed beds. In other words, supercritical fluids penetrate better and dissolve almost as well as typical liquids. Therefore, supercritical fluids are more efficient to use for extractions of complex matrices.

Carbon dioxide is the principal extracting fluid used in supercritical fluid extraction systems because it is cheap, innocuous, readily available at high purities, and has a relatively low critical temperature of about 31° C. Thus, it is useful for thermally labile compounds and to avoid the hazards of high temperature flammable solvents. Furthermore, it is mutually soluble with many common liquid solvents.

It has been found that carbon dioxide has a solvent power similar to that of hexane. Hence, many applications exist that require great solvent power, the advantageous properties of supercritical fluids, and mild operating temperatures for thermally labile compounds. Mixtures of carbon dioxide plus modifiers can meet these requirements. As is well known to those of ordinary skill, supercritical fluids can be used as solvents in extractions and chromatography; in such applications carbon dioxide is the preferred solvent. Other fluids, e.g., ethane, nitrous oxide, ethylene, or sulfur hexafluoride, that have critical points near ambient temperature (25° C.) can also function as the base solvent. The capability to utilize these alternative solvents is preferably not exploited because of the potential danger in using these solvents.

U.S. Pat. No. 5,133,859 describes a sample preparation device, which extracts sample components from complex matrices using supercritical carbon dioxide as the principal extracting solvent, and which presents the resulting extract in a user-chosen sample collection vessel. Traditional preparative procedures such as solvent extraction, Soxhlet extraction, liquid/liquid extraction, concentration, and evaporation are replaced with the solvent power stepwise settable by the parameters of density, modifier concentration, and temperature.

The supercritical fluid extractor can mimic column chromatography sample fractionation in some applications. Accordingly, the fluid flow system apparatus comprises control apparatus having a variable and controllable flow restriction and a sample container section. The sample is inserted into the sample container section, the temperature, pressure, flow rate and extraction time setpoints are inputted into the control apparatus, and pressurized fluid is provided.

By directing the fluid to a pump—which injects the fluid into the flow system apparatus at the input flow rate setpoint—the extraction process is initiated. The system pressure is sensed as fluid is pumped into the system, and the variable flow restriction is regulated to achieve and to maintain the setpoint pressure. Extraction is accomplished by directing fluid through the sample at the setpoint flow rate, and by directing a fluid mixture leaving the sample container section to an expansion nozzle section.

Preferably, the methods include maintaining the controlled setpoints of flow, pressure, and temperature until the input extraction time is achieved. The methods also contemplate opening and closing the orifice in order to control the variable flow restriction, or closing the orifice until setpoint pressure is achieved and controlling the restriction of the orifice to maintain the setpoint pressure.

In one class of supercritical fluid extraction of soluble components from a sample using a supercritical fluid, the components dissolved in the extraction fluid are separated from the fluid by allowing the extraction fluid to vaporize. For extraction, supercritical fluid flows through material to be extracted.

As described in U.S. Pat. No. 6,149,814, the fluid flows through a heat exchanger so that the heat exchanger is at the same temperature as a pressure vessel and an extraction tube. Before using the extraction system, the pump is set to the desired pressure and the heater block is set to the desired temperature. The internal cavity is then filled or partly filled with sample to be extracted. Pressurized fluid flows through a valve into the heat exchanger so that it is at the desired supercritical temperature, and flows into the cavity. This supercritical fluid flowing through the interior sample cavity of the extraction cartridge extracts the soluble components from the sample contained within the cavity.

In making aerogel products via a conventional process, the solvent from the gelling step must be removed to form a desired aerogel monolith. To do this, the wet gels—after a proper aging process—are quickly placed into an extractor that is filled with liquid carbon dioxide.

The relatively long solvent exchange process then begins, during which the temperature and pressure are maintained below critical conditions. Once the solvent exchange is complete, the extractor is sealed and the sealed extractor is heated to above the critical point of the $CO_2$. After a short thermal stabilization period, the extractor is slowly depressurized while it is heated to maintain the temperature inside the aerogels sufficiently high to avoid condensing the $CO_2$ as the pressure is decreased to 1 atmosphere.

It is desirable to shorten the time period for completing all of these and other processes involving replacement in a porous matrix of one fluid by a second fluid, or involving extraction of a soluble component using a supercritical fluid.

In copending application, U.S. Ser. No. 09/693,390 filed Oct. 20, 2000, the processing time for preparing aerogel products, once wet gels have been placed inside an extractor for supercritical drying, is reduced substantially by a method wherein a first fluid within a gel is replaced by a second fluid while applying pulses of pressure having at least one frequency to the gel, the first fluid and the second fluid during the exchange. The disclosure of U.S. Ser. No. 09/693,390 filed Oct. 20, 2000 is hereby incorporated by reference.

SUMMARY OF THE INVENTION

It has been discovered that the time for replacement of one fluid in a porous medium by a second fluid in various processes can be shortened substantially by the use of pressure waves applied to the replacement second fluid. In accord with the present invention, the pressure waves are applied in addition to any pressurization and/or depressurization cycle conventionally used for processing. The application of pressure waves in accord with the present invention enhances fluid transport in the porous medium. In preferred aspects of the invention, at least one of the fluids is compressible. The methods of the present invention can be used, for example, for rapid drying of any open porous substances ranging from small pored materials, such as aerogels and xerogels, to larger pored substances, such as industrial articles, thin films, agricultural articles (e.g., densely stacked vegetables, coffee beans, hops and/or other grains), pharmaceuticals, and/or paper-based products, cloth, clothing, etc.

Examples of processes contemplated within the scope of the present invention include, without limitation, the following exchanges of fluids in porous media:

liquid to liquid—e.g., water/ethanol exchange for a hydrogel process using water glass.

liquid to vapor/gas—e.g., initial process for drying vegetables, clothes, xerogels, etc. during which water is removed by evaporation into the air (i.e., air replaces the water in the porous medium).

vapor to vapor/gas—e. g., subsequent process for drying vegetables, clothes, xerogels, etc. once the liquid phase has been mostly removed from the objects, leaving only vapor phase remaining inside. Another example is the depressurization process of Alcogel after solvent exchange.

liquid to supercritical fluid—e.g., solvent exchange process for Alcogel in which alcohol from inside the Alcogel is extracted using supercritical $CO_2$.

More particularly, the present invention is directed to the use of pressure fluctuation, such as a pressure wave or a series of pressure pulses, to enhance the exchange of fluids in porous media, or to extract soluble materials from one or more porous media. In preferred aspects of the invention, high frequency pressure fluctuations increase the effective mass and/or heat diffusivity at either the interface between the exchanging fluids in the porous medium, or the interface between the solvent and the soluble material contained in the porous medium, and low frequency pressure fluctuations increase the effective mass transport and/or heat transfer rates through the porous medium. The pressure pulses applied in accord with the present invention provide pressure fluctuations around the pressure set point or pressure profile conventionally used in a process.

In certain preferred aspects of the invention, at least one of the fluids is a compressible fluid. A preferred compressible fluid for extraction of a soluble component from a porous medium is a supercritical fluid. Certain alternative aspects of the present invention also provide a method for increasing the diffusion of a compressible fluid into a porous structure, e.g., to extract a soluble component from within the porous medium, by applying to the compressible fluid pressure pulses at predetermined frequency and amplitude.

As used herein, the term "porous medium" includes any material in which a fluid can diffuse from the exterior into the interior thereof, or vice versa.

As used herein, the term "aerogel" includes (unless context requires a narrower meaning) not only a conventional aerogel, but also similar structures that have a micro-porous or nanoporous lattice structure from which a solvent has been removed, such as a xerogel, silica gel or zeolite.

The term "beads" refers to aerogel bodies of generally spherical shape having a diameter, that is typically in the range of tenths of millimeters to about a centimeter.

The term "monolith" refers to a single aerogel body having a minimum dimension, i.e. thickness, with the other two dimensions being larger than the thickness, or to a cylindrical object having a diameter. The thickness or diameter is typically in the range of millimeters to tens of centimeters.

The term "composite" refers to an aerogel that has been formed with another substance, e.g. glass fibers, in the gels.

The term "solvent" refers to the liquid dispersion medium used to form gels, or to a fluid in which a component contained in a porous medium is soluble.

The term "gas" denotes a fluid, wherein the pressure is below the supercritical pressure for that fluid, and wherein the temperature is higher than the vapor pressure at the temperature.

The term "fluid" refers to any of a gas, a vapor, and a liquid.

The term "vapor" refers to the gas in contact with a liquid, both being composed of molecules of the same substance.

The term "supercritical fluid" refers to a fluid having a pressure above the critical pressure and a temperature above the critical temperature required to make a particular fluid supercritical.

The term "pulse" refers to a fluctuation of pressure in a fluid by the application of vibrational energy, generally in the form of separate and discrete pulses, for example a shock wave or a cycle of a continuous wave, or a discrete period of application of a continuous wave. The pulse (or wave) preferably has a sinusoidal wave form, but other wave forms, e.g. saw-tooth, square, Gaussian, and harmonics of any of these, may be used. The frequency or the amplitude of a series of pulses can be ramped.

Although certain aspects/embodiments of the present invention are described generally hereinafter by referring to supercritical carbon dioxide as the supercritical extraction fluid, all such references are intended to include alternative supercritical extraction fluids unless such references are otherwise specified as being specific to carbon dioxide. All references to "critical temperature," "critical pressure," and "critical conditions," refer to the temperature and pressure conditions that apply for the specific supercritical fluid being discussed.

DETAILED DESCRIPTION OF THE INVENTION

The present invention provides a method for enhancing fluid transport in a porous medium. Thus, the present invention provides a method for enhancing the replacement of a fluid in a porous medium by a second fluid, or a method for enhancing the extraction of a soluble component contained in a porous medium. The method provides one or more pressure pulses with different frequencies and/or amplitudes to the fluid and porous medium during the replacement or extraction process. Preferably, a series of pressure pulses is applied to the fluid and porous medium during the replacement or extraction process. More preferably, a continuous pressure pulsation is applied to the fluid and porous medium during the replacement or extraction process.

In accord with the present invention, superimposing the pressure pulsation of the fluid and porous medium upon the otherwise conventional process for fluid replacement or soluble component extraction in a porous medium substantially speeds up the process. Thus, if the conventional process includes a cycle of pressurization and depressurization, the present invention superimposes on that conventional process cycle, pressure pulsation of the fluid and porous medium, thereby enhancing fluid transport within the medium. The pressure pulsation in accord with the present invention can be applied for a portion of the time period during the conventional process cycle, or it can be applied continuously throughout the conventional process cycle.

The pressure pulsation can be applied generally with a frequency in the range of about 0.0001 Hz to about 100 MHz. Preferred ranges of pressure pulse frequency include low frequency ranges of about 0.0001 Hz to about 10 Hz or about 0.001 to about 1 Hz and high frequency ranges of about 2,000 Hz to about 50,000 Hz and about 5000 Hz to 30,000 Hz. However, the optimum frequency can be higher or lower those measurements encompassed by these ranges, depending upon the particular fluids, the particular porous medium, and/or the desired characteristics of the final product being made.

Maximum allowable pressure amplitudes for pressure pulses will depend upon the particular porous medium and upon the frequency of pulsing. Typically, other things being equal, the maximum allowable pressure amplitude will decrease as the frequency increases. The pressure pulse also usually will not cause material expansion or contraction of the matrix of the porous medium. In general, the pressure amplitude will be between about 0.0001% and about 50%. When more than one frequency is used, the pulse amplitude of the lower frequency will be greater than the pulse amplitude of the higher frequency.

In general, the pressure amplitude of the high frequency pulses will be between about 0.0001% and about 10% of the mean process pressure. Particularly, the pressure amplitudes of high pressure pulses will be between about 0.001% and about 5% of the mean process pressure and, more particularly, between about 0.01% and about 3% of the mean process pressure. In certain preferred embodiments, the pressure amplitudes will be between about 0.01% and about 2% of the mean pressure.

In general, the pressure amplitude of the low frequency pulses will be between about 1% and about 50% of the mean process pressure. Particularly, the pressure amplitudes of low pressure pulses will be between about 2% and about 40% of the mean process pressure and, more particularly, between about 3% and about 30% of the mean process pressure. In certain preferred embodiments of the invention, the low pressure pulse pressure amplitudes will be between about 3% and about 20% of the mean pressure.

For example, if low frequencies in the range of about 0.0001 to about 10 Hz and are encountered during the supercritical extraction process, pressure amplitudes ranging from about 10 psi to up to 1000 psi (preferably about 100 psi to 600 psi), are generally useful, provided that the material can tolerate the pressure gradient. For high frequencies, useful pressure amplitudes during supercritical extraction process typically will be in the range of about 0.01 to about 20 psi, more typically about 0.3 to 5 psi, and often in the range of about 0.5 to 3 psi.

The efficiency of the solvent exchange procedures that utilize/incorporate an extraction fluid can be enhanced by increasing the fluid's effective mass diffusivity.

More particularly, improved solvent exchange efficiency may be obtained by cycling or pulsing the extractor pressure. For example, high frequency/low amplitude pressure fluctuations can be used to promote mixing and mass diffusion at the interface of the two fluids within the porous media. Alternatively, low frequency/high amplitude pulsations can be used to effectively pump out high solvent concentration solution from inside porous media, and to pump in fresh solvent into the porous media if the extraction fluid is compressible, which is the case with supercritical fluids such as $CO_2$. By supplying fresh fluid, this pumping action also provides a mechanism for heating or cooling within the porous media with fluid having a different temperature being supplied externally of the porous media.

Preferably, two or more pulsations having different amplitudes and frequencies are used simultaneously for a compressible fluid. The pressure cycling/pulsations result in an active pumping and/or enhanced diffusion and mixing process that is more effective than passively relying on simple diffusion of solvent from the gels into the supercritical fluid at slowly changing or constant pressure conditions.

The fluid exchange process is considered to be satisfactorily performed by the method of extraction when the solvent content in the extraction fluid at the discharge of the extractor is less than a predetermined level, the exact value of which will depend upon the specific process being performed, the properties of the fluids involved (the diffusivities ands viscosities), pore size distribution, physical sizes and shapes of the gels being processed, as well as the frequencies and amplitudes of the pulsations used. Generally, however, satisfactory levels will be less than about 50 ppm, preferably less than about 20 ppm, and most preferably less than 1 ppm, provided that the discharge solvent content is representative of the solvent content within the porous medium.

Without wishing to be bound by a theory, it is believed that high frequency pulsing accelerates fluid exchange within a porous medium because pulsing rapidly dilutes the solvent that is near the boundary between the extraction fluid phase and the liquid solvent phase, inside the porous medium. This applies also to the solvation of a soluble component at the boundary between the solid and liquid in the porous medium.

For example, for mixtures of supercritical fluid and solvent, it is postulated that there is a single phase region, called a "mixed fluid supercritical region," wherein the mixture with the dissolved solvent is supercritical. It has unexpectedly been discovered that this single phase region of supercritical conditions for many solvent/supercritical fluid mixtures occurs sufficiently near the critical point of the supercritical fluid to use the supercriticality of the mixed fluid to enhance the rate of extraction of the solvent from within the porous medium, thereby reducing the overall process time. Similarly, the rate of extraction of a soluble component by a supercritical fluid is also enhanced.

Using an example of ethanol as the solvent and $CO_2$ as the supercritical fluid (such as can be encountered in extraction of solvent from an aerogel), a mixture containing about 50% of each by volume is a single phase and is supercritical at pressures above about 1100 psi (ca. 80 MPa) and at temperatures above about 35° C. This is near the usual operating pressures and temperatures for maintaining $CO_2$ in the supercritical state. Therefore, at the initial moment of contact between the wet gels and the super-critical fluid, inter-diffusion begins at the interface between the solvent ethanol inside the wet gels, and at the supercritical $CO_2$ outside the gels as well. The inter-diffusion is enhanced by transmitting a high frequency fluctuation through the super-critical $CO_2$.

As the mixing at the interface continues, the thickness of the mixing region increases. Soon the external portion of the mixing layer will reach a threshold of "turning supercritical." Since a supercritical fluid is readily compressible like a gas, as opposed to poorly compressible like a liquid, when the mixed fluid turns supercritical it is in a compressed form both within the extractor generally and within the gel specifically, such that more of the molecules will on average move into the gel.

When the gas re-expands, molecules—not necessarily the same molecules—move out of the "mixed fluid supercritical region" of the gel. Then, when the next pulse compresses the supercritical fluid, a fresh load of supercritical $CO_2$ is pushed into the mixed fluid supercritical layer that has by now increased in thickness. Therefore, to the extent that there is mixing or mutual inter-diffusion between the solvent liquid and the supercritical mixed fluid, molecules of the solvent liquid are then mixed into the supercritical mixed fluid and the new mixed fluid remains supercritical and is removed from the aerogel. This solvent removal is supplemental to the solvent removal due to pure diffusion, and is much faster.

Without wishing to be bound by a particular theory, the mechanism of diffusion enhancement by high frequency pressure pulses, for example, at the interface region of the solvent (liquid ethanol) and the supercritical mixed fluid phase (containing $CO_2$ and ethanol), is believed to be due to differences in wave propagation speed and acoustic impedance within the solvent vs. within the supercritical mixed fluid phase.

The pressure wave will first travel through the supercritical phase outside the gel, then through the mixed fluid supercritical phase near and in the gel, and then will arrive at the interface with the solvent liquid in the gel. Due to the impedance discontinuity, the pressure wave will be split into two waves at the interface: a transmitted wave and a reflected wave. The fluid particles at two sides of the interface region will tend to move at different speeds due to different wave propagation speeds. To accommodate the impedance discontinuity-induced wave phenomena and the particle velocity discrepancies between the two sides, the interface region between the portion of the gel still containing solvent liquid and the rest of the gel containing supercritical mixed fluid will be perturbed and well mixed, thereby promoting enhanced diffusion across the interface region. This pulse-enhanced diffusion is much faster than natural diffusion.

As the enhanced diffusion process proceeds, the interface region moves in the direction of the remaining solvent liquid region of the gel until that region completely disappears and the entire gel structure contains only supercritical phase fluid. Once this happens, the fluid inside the whole gel structure participates in the mass transport enhanced mostly by slower pulses that generate longer distance pumping effect. The pumping action of the slower pressure pulses rapidly lowers the solvent concentration inside the gel at a rate much faster than simple diffusion process that relies on a concentration gradient. When the concentration of the solvent in the supercritical phase at the innermost portion of the gel, or the highest local concentration of the solvent inside the gel, reaches a low level, e.g. less than about 50 ppm, preferably less than about 20 ppm, and most preferably less than 1 ppm, the solvent extraction process is considered finished and depressurization can begin.

For low frequency, high amplitude pulses are used, because they serve to enhance solvent removal in the following manner. During the expansion period with low frequency (long wavelength) fluctuations, supercritical mixed fluid having a higher concentration of dissolved solvent (or other soluble component) will flow out of the porous medium, thus enhancing the rate of solvent removal from the gel. During the compression period, the supercritical fluid having a lower concentration of solvent will be forced back into the gel, thus replenishing the gel with fresh supercritical fluid charge at a lower solvent concentration and at the process temperature of the extractor. For example, the density of supercritical $CO_2$ will nearly double when the pressure increases from 1100 psi to 1500 psi at 40° C. In other words, after a compression swing of this amount, fully 50% of the molecules inside the "mixed-fluid supercritical" layer inside the porous medium will come from the fresh supercritical $CO_2$ stream outside the porous medium, thereby lowering the concentration of the solvent (or other soluble component) in the "supercritical boundary layer"

and supplying heat to the "supercritical" boundary layer that had undergone an expansion-related temperature drop.

During the subsequent expansion stroke, the heat provided during compression will prevent condensation of the expanding fluid, and fully 50% of the molecules inside the "supercritical" layer will come out of the porous medium into the supercritical fluid to be swept away. The low frequency high amplitude compression and expansion cycles are repeated until the soluble component is substantially removed from the porous medium, i.e., until the porous medium contains mostly supercritical fluid with only a trace amount of soluble component.

Also, as the pressure increases during the low frequency compression period and as the fluid is pushed into the porous medium, the solubility of the supercritical fluid increases almost as a linear function of the supercritical fluid density, thereby promoting the diffusion/solvation process inside the porous medium. Once the solvent (or other soluble component) has dissolved into the supercritical fluid and the pressure has decreased, the density of the supercritical fluid lowers, thus causing the fluid to expand out of the porous medium. The increase in solute solubility of a supercritical fluid such as supercritical $CO_2$ with compression is an additional factor enhancing diffusion of solute from within the porous medium.

Moreover, in preferred embodiments of the invention, it is useful to gradually increase the wavelength (decrease the frequency) of the pressure pulses as the front between the supercritical fluid and the soluble component moves into the porous medium and as the distance to travel from the mixing layer to the surface of the porous medium increases.

Therefore, there is independent utility in each of high-frequency pulses, low-frequency pulses, and a ramping upward (gradual increase) of the wavelength of at least the low frequency pulses. The combination of two different frequency of pulses, with optional ramping, can be especially effective.

The amplitude of the high frequency pulses at a given frequency generally is less critical. Higher amplitudes will tend to accelerate the exchange process—ideally linearly, but in practice at less than linearly due to dissipation. The amplitude at a given frequency also has an upper limit, above which the gradient of pressure during a pulse is large enough to damage the structure of the porous medium.

When the pores are very small, as in aerogels, the frictional force exerted on the structure by passage of fluid is surprisingly large. For example, in many aerogels, the upper limit of pressure amplitude for high frequency pulses will be about 5 psi. A pressure amplitude range of about 0.1 to 4 psi will be typical for most aerogel materials. The maximum permitted pressure amplitude is dependent on the frequency or wavelength of the sound waves. This is because as the frequency increases, the rate of fluid movement increases, and this can place a higher pressure gradient across local regions of the porous medium than is found at lower frequencies of the same amplitude.

For a supercritical $CO_2$ extraction in an aerogel (generally performed at pressures of about 1,100 to 1,800 psi (7585 to 12,411 kPa)), suitable high frequency pulses will have a frequency in the range of about 1 Hz to about 100 MHz, more typically 2,000 to 50,000 Hz, and in many cases in the range of about 5000 to 30,000 Hz. Corresponding maximum allowable pressure amplitudes, which will decrease as the frequency increases and which will depend on the pore structure of the gel, will typically be in the range of about 0.01 to about 20 psi, more typically about 0.3 to 5 psi, and often 0.5 to 3 psi.

For the slower pulses, the frequency can be in the range of about 0.0001 to about 10 Hz, more typically in a range of about 0.001 to about 1 Hz. Corresponding pressure amplitudes generally range from about 10 psi to up to 1000 psi, more preferably 100 psi to 600 psi, provided that the material can tolerate the pressure gradient, and allowing for the pressure amplitude of the high frequency pulses when used simultaneously.

Specific pressure amplitude/frequency combinations should be determined for particular compositions of porous materials by routine experimentation, when taking into consideration, e.g., the specific porosity, pore size distribution, compressive and tensile strengths of the lattice structure, as well as physical size and shape of the materials. Under suitable selection of frequencies and pressure amplitudes, the porous materials are not damaged during the active extraction process either by fluid dynamic erosion, pressure difference induced stress, or otherwise. Also, the resulting temperature swing is not so large as to cause stress failures or loss of supercriticality of the fluid inside the porous material.

Other frequencies or wavelengths can be used, depending upon the nature of the porous medium and the fluids. It is specifically contemplated that higher frequencies, for example in the range of 100,000 to 10 million Hz (used, e.g., in ultrasound and lithotripsy) can be used where suitable. Such faster cycles can require lower amplitudes to avoid creating excessive pressure gradients.

In selecting a pulse amplitude, it should also be noted that an excessive pressure drop, starting from a particular pressure and temperature, can cause a phase change of a supercritical fluid into a conventional liquid or gas. If the amplitude is sufficiently large, it can also cause recondensation of the solvent into a separate liquid phase due to a reduction in solubility when the density is reduced by pressure reduction, and despite the extraction fluid remaining supercritical. If the phase of the extraction fluid changes from supercritical to a gas, most of the solvent will recondense due to a drastic reduction in solubility.

If appropriately limited, however, a moderate degree of lowering of the pressure or density will not cause re-condensation of the solvent.

It should be noted that during pressure fluctuations, the shape and size of the lattices and their pores do not undergo any appreciable dimensional changes because the pressure will remain sufficiently balanced isometrically provided that (i) the speed of the change is slow enough to be quasi-steady for the slower pressure fluctuations, and (ii) the amplitudes of the faster fluctuations are much smaller than the mean pressure and lower than the threshold pressure to cause structural changes. There is hydrostatic quasi-equilibrium inside the entire gel volume and during the cycling that status does not change.

The pressure fluctuation process relies, in one mode, on the fact that supercritical $CO_2$ behaves like a gas in terms of compressibility. So, when compressed, more supercritical $CO_2$ can be packed into the same pore volume as before. And when expanded, the soluble component laden supercritical $CO_2$ tends to come out of the porous medium.

Pressure pulses suitable for the practice of the invention can be generated by any means or method that gives/produces the required frequency and amplitude of pulsations in pressure inside the extractor. The source of the pulses can be inside the extractor, outside the extractor (and typically in intimate contact with it), or can form a part of the extractor.

The pulses can be generated by one or more of a piezoelectric device, an electromechanical device, a piston, a mechanical device, a diaphragm, a bellows, an inflatable device, or by variation of the input pressure or the back-pressure of a fluid or a gas flowing through the extractor. For example, a piezoelectric device can be the driver for a hydrophone, and an electromechanical device can be a solenoid, as is used in a loudspeaker. A mechanical device could include a striking hammer, as is used to strike a bell. An inflatable device can be an expandable balloon or bellows, either within the extractor or exterior to it and connected by a port. An inflatable device can be inflated by a gas or liquid. Likewise, a piston can be internal, or external via a port, and can be moved by pressure or by mechanical force.

Each of these methods of generating a series of pressure waves is well known. For example, back pressure can be varied under electronic control by opening and partially closing the exit port or the entrance port of an extractor (or other closed vessel) while applying a constant pressure to a fluid entering or exiting through another port. Coupling of a source of pulsation to the extractor can be by any method known to those skilled in the art.

The methods of the present invention can be utilized in a variety of cases where pressure fluctuation causes changes equilibrium vapor pressure, solute solubility, etc. Specific examples include the following. However, these are only examples where the methods of the present invention can be used. The invention is not limited to these specific examples.

EXAMPLE 1

Interdiffusion of Ethanol and Water Inside Wet Gel

Two wet gel samples were prepared from tetra-ethoxysilane essentially as described in the art. A red dye soluble in ethanol but not in $CO_2$ was dissolved into ethanol. During the gel preparations, the ethanol-dye solution was used in place of conventional pure ethanol. This resulted in red colored wet gel samples. To evaluate the effect of pressure pulses on the enhancement of diffusion process, two wet gel samples prepared by the above method were processed as follows.

The first sample was simply immersed in a jar containing pure ethanol, and the diffusion of the red dye was monitored. The second sample also was immersed in a same sized jar of pure ethanol, but then the jar was placed in a sonic bath. In between the bottom of a sonic bath and the bottom of the jar containing the wet gel sample, there was a 1.25 cm thick sponge pad to attenuate the amplitude of the sonic pulse to the point that the sonic energy did not breakup the wet gels.

The sonic cleaning bath generated fixed wavelength pulses at 20 kHz. The diffusion of the red dye out of the wet gels into the ethanol bath was observed and periodically photographed. A UV spectrometer measured the frequency of the UV light transmitted through the ethanol.

The results showed that the dye was extracted much more rapidly in the sample under sonication. Extraction to visual color equilibrium between the wet gel and the ethanol bath was obtained in about 45 minutes in the pulse-assisted case, as opposed to more than 16 hours in the case of the wet gel and the ethanol bath without the pulse-assist.

EXAMPLE 2

Drying of Xerogels

Unlike aerogels (which, after solvent exchange, can be dried under supercritical pressure conditions), xerogels almost uniformly are dried under atmospheric conditions. For example, because of the nano-sized pores present therein, xerogel beads are generally dried in ovens, and only after anti-shrinkage materials have been introduced into the wet xerogels. Because the nanometer-sized pores are so small, they tend to maintain the liquid and/or vapor trapped therein under these pressure conditions, thus rendering the drying process slow (i.e., because of the relatively low rate of diffusion within the beads, and due to evaporation and heat transfer between the drying gas and the beads).

However, in accordance with the methods outlined above, the process is greatly expedited. In particular, the pressure pulses/fluctuation facilitates the removal of the trapped liquid and/or vapor and, in turn, allows for improved diffusion, evaporation, and heat transfer.

EXAMPLE 3

Evaporation of Water from Porous Articles such as Clothes, Vegetables, Paper, etc. into Air Water evaporates as long as the vapor pressure in the receiving gas is lower than the equilibrium vapor pressure for a given fluid and temperature. When the pressure is lowered by pressure pulsation suddenly to less than the equilibrium pressure for the given temperature, the water will evaporate at much higher rate to reach the equilibrium at that lowered pressure level. Once the water evaporates into the air—during the expansion cycle in accord with the present invention—the moistened air is taken away from the clothes rather than recondensed into liquid in the materials being dried during the recompression cycle.

Evaporation of water requires a supply of heat; and ordinarily, the heat has to be transported mostly by convection from the drying air onto the surface of the article being dried, followed by conduction through the porous media, which can be quite poor conductors. In the meantime, the evaporation process tends to cool down the porous article, thus further reducing the rate of heat transport into the porous article to be dried.

If, for example, one seeks to dry a porous media that is filled with saturated vapor, except for its interior section, which is filled with liquid. In accordance with a normal drying process, the saturated vapor has to diffuse out of the porous media and the drying air has to diffuse into the porous media based on pure mass diffusivity. The vapor, which has a relatively poor thermal conductivity to begin with, is coming out of the porous media, and, therefore, behaves as an undesirable thermal barrier between the liquid deep inside the porous media to be evaporated and the heat contained in the drying air outside the porous media.

In the case of pulse assisted drying, however, the lingering vapor phase inside the porous media is rapidly pumped out and fresh drying air with heat content is pumped back in effectively increasing the rate of heat and mass transport. In other words, in accordance with the pulse assisted drying process, the mass transport between the drying air and the liquid vapor is enhanced, and, by virtue of the enhanced mass transport, the heat transport is enhanced as well.

Thus, another factor favoring pressure pulsation is that due to increased mass transport, the effective heat transfer rate between the drying air and the porous article is significantly enhanced, as is the rate within the porous media. Therefore, the drying process becomes much more efficient than constant pressure dryers.

EXAMPLE 4
Interdiffusion of Two Different Vapors/Gases

Once the liquid phase is evaporated or removed by diffusion from any part of the porous media, that entire region inside the porous media becomes "compressible," and the subsequent low frequency pressure fluctuation will create a so-called "pumping effect" in the region. In other words, fresh gas from outside will be compressed into the compressible region inside the porous media, mixed with high concentration vapor, and the resulting mixture will be pumped out on the down stroke. It is noted that the gas/vapor compression/expansion does not physically compress/expand the porous media.

EXAMPLE 5
"Evaporation" of Solvent from Inside of Wet Gels into Supercritical Fluid Solvent diffusion into supercritical fluid is very similar to "evaporation" of liquid into gas in that the solute solubility of the critical fluid also changes with pressure. This is equivalent to "vapor" pressure equilibrium for water/air system. When the pressure is increased, e.g., from 1200 $psi_2$ to 1400 psi for $CO_2$ above the critical temperature of 31.1° C., the ethanol solubility into supercritical $CO_2$ significanlty increases. It therefore will tend to absorb a higher concentration of ethanol into $CO_2$, and, as the pressure swings back down to 1200 psi, a large portion of the ethanol rich supercritical $CO_2$ from inside of the wet gel is pumped out and cannot go back in easily. Thus, the slow fluctuation of supercritical $CO_2$ increases "effective" diffusion of solvent from wet gel to the supercritical fluid outside.

EXAMPLE 6
Faster Extraction of Constituent Chemicals using Pulse Assisted S.C. Spectrochromatography U.S. Pat. No. 5,133,859 describes a sample preparation device, which extracts sample components from complex matrices using supercritical carbon dioxide as the principal extracting solvent, and which presents the resulting extract in a user-chosen sample collection vessel. Traditional preparative procedures such as solvent extraction, Soxhlet extraction, liquid/liquid extraction, concentration, and evaporation are replaced with the solvent power that is stepwise settable by the parameters of density, modifier concentration, and temperature. This enables the supercritical fluid extractor to mimic column chromatography sample fractionation in some applications.

A judicious use of pressure fluctuations in each column can speed up the fractionation process reducing the process time significantly and potentially reducing the size of the equipment and cost of processing.

EXAMPLE 7
Faster, More Efficient Decaffeination of Coffee Beans, Hops Extraction, etc.

Traditional methods of removing caffeine contained in coffee beans or hops extraction for beer production can also be sped up using the present invention of pressure pulse assisted extraction technique. During the conventional $CO_2$ extraction process, the pressure of the supercritical extraction fluid, e.g., $CO_2$, can be pulsed to enhance removal of dissolved ingredients from inside the coffee beans or hops.

EXAMPLE 8
Solvent Exchange Process in Wet Gels

Whenever there is a need to exchange solvents for wet gels, either to remove contaminants or facilitate a subsequent supercritical extraction, pulse assisted solvent exchange process will significantly enhance the speed of the solvent exchange.

For example, water glass derived wet gels will contain water and salt within the porous structure. During the salt washing process by water, high frequency pulses will effectively expedite the washing process. During the subsequent solvent exchange of water with ethanol, again high frequency pulses can be used to speed up the removal of water content from inside the wet gel structure.

The amplitude and frequencies one can use for the present purpose can be determined analytically, empirically or by a combination of both. General guidelines are as follows.

The amplitudes should not be high enough to cause physical damage to the porous media at the frequency used. Also, typically, the amplitudes should not have any significant effect on the volume of the matrix. Volume expansion or contraction of the matrix of the porous medium generally is not desirable, nor practical for the present invention.

The total pressure differential between any two points inside the porous media should be lower than that which will cause damage to the porous media. For example, some silica aerogels will have a maximum tensile strength of 5 psi. In such cases, the pressure fluctuation should not cause more than 5 psi tensile load between any two points inside the gels. The open porosity and tortuosity of the lattice structure will determine the transient pressure drop through which the pressure will change with time. In the case of drying wet articles in air, the pressure amplitudes generally will be dictated by other considerations such as economically allowable pressure containment and pulse generation methods, in addition to the above considerations when appropriate.

The methods of the invention are particularly useful in porous media that is wet with a liquid for which the removal of the liquid is through phase change of the liquid, followed by diffusion or direct diffusion into a "drying" fluid, and in which internal small flow passages become saturated with the "vapor" or "liquid" from the liquid and diffusion of mass and heat is a dominant and a limiting mechanism to remove the "solvent vapor" to the outside of the porous article.

As discussed above, the method provides controlled pressure fluctuations of drying fluid surrounding and inside the porous material to be dried. In such cases, the phase change also requires a supply of heat from external sources in order to maintain the temperature of the liquid inside the porous article being dried, and that the heat contained in the compressible fluid with enhanced transportability due to pressure fluctuations will help supply the heat to the interior of the porous article. In the case of supercritical fluid used as compressible fluid, this supplied heat can be used to prevent recondensing of supercritical fluid into potentially damaging liquid within the porous media.

In the case of drying of liquid from porous article into the air or other gases, the heat contained in the air getting pumped into the porous article will tend to have the effect of increased heat transfer from the drying gas into the interior, thereby further increasing the speed of drying. Preferably, pressure waves are applied to the extracting fluid to pump in fresh extracting fluid by increasing the pressure, and later to drain out the fluid by lowering the pressure during each pulse. The application of pressure waves at a predetermined frequency overcomes the diffusion limitation, and thereby greatly reduces the time for drying.

The invention has been described in detail including the preferred embodiments thereof. However, it will be understood that those skilled in the art may make modifications and improvements within the spirit and scope of the invention as set forth in the claims.

All documents (including, but not limited to, patents and patent applications) referred to herein are incorporated by reference in their entirety.

What is claimed is:

1. A method for increasing transport of fluids within a porous medium, said method comprising simultaneously applying a plurality of pressure pulses to the fluids, at least two of said plurality of pressure pulses having at least one of different frequencies and different amplitudes.

2. The method of claim 1, wherein at least one of the fluids is compressible.

3. The method of claim 2, wherein at least one compressible fluid is a supercritical fluid.

4. The method of claim 1, wherein the pulses have an amplitude in the range of about 0.0001% to about 50% of a mean process pressure.

5. The method of claim 1, wherein the pulses have a frequency in the range of about 0.001 Hz to about 100 MHz and an amplitude in the range of about 0.01 psi to about 1000 psi.

6. The method of claim 1, wherein the pulses have a frequency in the range of about 0.0001 Hz to about 100 kHz and an amplitude in the range of about 0.01 psi to about 10 psi.

7. The method of claim 1, comprising applying pressure pulses of at least two different frequencies.

8. The method of claim 7, wherein the at least two different frequencies include a high frequency pulse, and a low frequency pulse, and wherein the pressure amplitude of the high frequency pulse is in the range of about 0.0001% to about 10% of a mean process pressure and the pressure amplitude of the low frequency pulse is in the range of about 1% to about 50% of the mean process pressure.

9. The method of claim 8, wherein the pressure amplitude of the low frequency pulse is higher than the pressure amplitude of the high frequency pulse.

10. The method of claim 1, wherein the porous medium is a small pored structure selected from the group consisting of an aerogel, a xerogel, a silica gel, and a zeolite.

11. The method of claim 1, wherein the porous medium is a large pored article selected from the group consisting of an agricultural article, a paper-based article, an article of clothing, a thin film, and a pharmaceutical.

12. The method of claim 11, wherein the agricultural article is selected from the group consisting of a vegetable, a coffee bean, and a grain.

13. A method for reducing the time required to replace a first fluid located within a porous medium with a second fluid, which is miscible with the first fluid, said method comprising simultaneously applying a plurality of pressure pulses to the second fluid, at least two of said plurality of pressure pulses having at least one of different frequencies and different amplitudes.

14. The method of claim 13, wherein at least one of the fluids is a compressible fluid.

15. The method of claim 14, wherein the compressible fluid is a supercritical fluid.

16. The method of claim 13, wherein the pulses have an amplitude in the range of about 0.0001% to about 50% of a mean process pressure.

17. The method of claim 13, comprising applying pressure pulses of at least two different frequencies.

18. The method of claim 17, wherein two of the at least two different frequencies are a first frequency in the range of about 1 Hz to about 100 MHz and a second frequency in the range of about 0.0001 to about 100 kHz.

19. The method of claim 18, wherein the second frequency is lower than the first frequency.

20. The method of claim 18, wherein the pulses of the first frequency have an amplitude in the range of about 0.01 to 20 psi and the pulses of the second frequency have an amplitude in the range of about 0.1 to 1,000 psi.

21. The method of claim 20, wherein the amplitude of the second frequency is higher than the amplitude of the first frequency.

22. The method of claim 16, wherein the at least two different frequencies include a high frequency pulse, and a low frequency pulse, and wherein the pressure amplitude of the high frequency pulse is in the range of about 0.0001% to about 10% of a mean process pressure and the pressure amplitude of the low frequency pulse is in the range of about 1% to about 50% of the mean process pressure.

23. The method of claim 22, wherein the pressure amplitude of the low frequency pulse is higher than the pressure amplitude of the high frequency pulse.

24. The method of claim 13, wherein the porous medium is a small pored structure selected from the group consisting of an aerogel, a xerogel, a silica gel, and a zeolite.

25. The method of claim 13, wherein the porous medium is a large pored article selected from the group consisting of an agricultural article, a paper-based article, an article of clothing, a thin film, and a pharmaceutical.

26. The method of claim 25, wherein the agricultural article is selected from the group consisting of a vegetable, a coffee bean, and a grain.

27. A method of drying a porous medium containing a liquid, said method comprising;
providing a fluid to the porous medium under conditions to vaporize the liquid; and
simultaneously applying a plurality of pressure pulses to the fluid, at least two of said plurality of pressure pulses having at least one of different frequencies and different amplitudes.

28. The method of claim 27, wherein the fluid is compressible.

29. The method of claim 28, wherein the compressible fluid is a supercritical fluid.

30. The method of claim 27, wherein the pulses have an amplitude in the range of about 0.0001% to about 50% of a mean process pressure.

31. The method of claim 27, comprising applying pressure pulses of at least two different frequencies.

32. The method of claim 31, wherein the two or more different frequencies are a first frequency in the range of about 1 Hz to about 100 MHz and a second frequency in to the range of about 0.0001 to about 100 kHz.

33. The method of claim 32, wherein the second frequency is lower than the first frequency.

34. The method of claim 32, wherein the pulses of the first frequency have an amplitude in the range of about 0.001 to 20 psi and the pulses of the second frequency have an amplitude in the range of about 0.1 to 1000 psi.

35. The method of claim 34, wherein the amplitude of the second frequency is higher than the amplitude of the first frequency.

36. The method of claim 31, wherein the at least two different frequencies include a high frequency pulse, and a low frequency pulse, and wherein the pressure amplitude of a high frequency pulse is in the range of about 0.0001% to about 10% of a mean process pressure and the pressure amplitude of a low frequency pulse is in the range of about 1% to about 50% of the mean process pressure.

37. The method of claim 36, wherein the pressure amplitude of the low frequency pulse is higher than the pressure amplitude of the high frequency pulse.

38. The method of claim 27, wherein the porous medium is a small pored structure selected from the group consisting of an aerogel, a xerogel, a silica gel, and a zeolite.

39. The method of claim 27, wherein the porous medium is a large pored article selected from the group consisting of an agricultural article, a paper-based article, an article of clothing, a thin film, and a pharmaceutical.

40. The method of claim 39, wherein the agricultural article is selected from the group consisting of a vegetable, a coffee bean, and a grain.

41. A method of extracting a soluble component from a porous medium, said method comprising:

providing a fluid to the porous medium; and simultaneously applying a plurality of pressure pulses to the fluid, at least two of said plurality of pressure pulses having at least one of different frequencies and different amplitudes.

42. The method of claim 41, wherein the fluid is compressible.

43. The method of claim 42, wherein the compressible fluid is a supercritical fluid.

44. The method of claim 41, wherein the pulses have an amplitude in the range of about 0.0001% to about 50% of a mean process pressure.

45. The method of claim 41, comprising applying pressure pulses of at least two different frequencies.

46. The method of claim 45, wherein two of the at least two different frequencies are a first frequency in the range of about 1 Hz to about 100 MHz and a second frequency in the range of about 0.0001 to about 100 kHz.

47. The method of claim 46, wherein the second frequency is lower than the first frequency.

48. The method of claim 46, wherein the pulses of the first frequency have an amplitude in the range of about 0.001 to 20 psi and the pulses of the second frequency have an amplitude in the range of about 0.1 to 1000 psi.

49. The method of claim 48, wherein the amplitude of the second frequency is higher than the amplitude of the first frequency.

50. The method of claim 45, wherein the at least two different frequencies include a high frequency pulse, and a low frequency pulse, and wherein the pressure amplitude of a high frequency pulse is in the range of about 0.0001% to about 10% of a mean process pressure and the pressure amplitude of a low frequency pulse is in the range of about 1% to about 50% of the mean process pressure.

51. The method of claim 50, wherein the pressure amplitude of the low frequency pulse is higher than the pressure amplitude of the high frequency pulse.

52. The method of claim 41, wherein the porous medium is a small pored structure selected from the group consisting of an aerogel, a xerogel, a silica gel, and a zeolite.

53. The method of claim 41, wherein the porous medium is a large pored article selected from the group consisting of an agricultural article, a paper-based article, an article of clothing, a thin film, and a pharmaceutical.

54. The method of claim 53, wherein the agricultural article is selected from the group consisting of a vegetable, a coffee bean, and a grain.

* * * * *